(12) United States Patent
Ette

(10) Patent No.: US 11,276,259 B2
(45) Date of Patent: Mar. 15, 2022

(54) INTERIOR AND EXTERIOR RECOGNITION OF ID TRANSMITTERS FOR A VEHICLE

(71) Applicant: VOLKSWAGEN AKTIENGESELLSCHAFT, Wolfsburg (DE)

(72) Inventor: Bernd Ette, Wolfsburg (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/939,399

(22) Filed: Jul. 27, 2020

(65) Prior Publication Data
US 2021/0027130 A1    Jan. 28, 2021

(30) Foreign Application Priority Data
Jul. 26, 2019   (DE) ..................... 10 2019 211 192.0

(51) Int. Cl.
*G07C 9/00*  (2020.01)
*H04W 4/48*  (2018.01)
*G06K 19/077*  (2006.01)
*G07C 5/08*  (2006.01)

(52) U.S. Cl.
CPC .......... *G07C 9/00309* (2013.01); *G07C 9/00* (2013.01); *G07C 9/00182* (2013.01); *G06K 19/07758* (2013.01); *G07C 5/0841* (2013.01); *H04W 4/48* (2018.02)

(58) Field of Classification Search
CPC ........ G07C 1/00; G07C 9/00; G07C 9/00182; G07C 9/00309; G07C 9/00007; G08C 13/00; G08C 13/14; G08B 13/14
See application file for complete search history.

(56) References Cited

U.S. PATENT DOCUMENTS

| 9,154,920 | B2 | 10/2015 | O'Brien et al. |
| 10,002,535 | B1* | 6/2018 | Hille ...................... B60Q 5/005 |
| 10,351,101 | B2 | 7/2019 | Neuhoff |
| 2006/0290503 | A1* | 12/2006 | Sumida ................. B60R 25/245 |
| | | | 340/572.1 |
| 2014/0375420 | A1* | 12/2014 | Seiberts .................. B60R 25/20 |
| | | | 340/5.31 |

(Continued)

FOREIGN PATENT DOCUMENTS

DE          10341286 A1    4/2005
DE       102013225600 A1    9/2014
(Continued)

*Primary Examiner* — Van T Trieu
(74) *Attorney, Agent, or Firm* — Barnes & Thornburg LLP

(57) ABSTRACT

A system and a method for ascertaining if an ID transponder is located in the interior of a transportation vehicle. This is described as interior and exterior identification of an ID transponder. The system includes one or more of ultra-wideband transmission and receiving devices arranged on the transportation vehicle and an ID transponder having an ultra-wideband transmission and receiving device and an inertial sensor system arranged in the ID transponder by which inertial sensor system self-movements of the ID transponder are recorded, wherein each of the access openings is associated with at least one of the one or more of ultra-wideband transmission and receiving devices arranged on the transportation vehicle. A transportation vehicle and an ID transponder with which the method is performed.

18 Claims, 7 Drawing Sheets

(56) References Cited

U.S. PATENT DOCUMENTS

| | | |
|---|---|---|
| 2015/0258962 A1 | 9/2015 | Khanu |
| 2015/0291126 A1 | 10/2015 | Nicholls et al. |
| 2016/0050531 A1* | 2/2016 | Choi .................... H04W 4/027 455/456.2 |
| 2018/0099643 A1 | 4/2018 | Golsch et al. |
| 2018/0148015 A1 | 5/2018 | Weghaus |
| 2018/0208204 A1* | 7/2018 | Chen ...................... G06F 1/163 |
| 2018/0312137 A1* | 11/2018 | Neuhoff .................. G07C 9/28 |
| 2019/0256047 A1 | 8/2019 | Iwashita et al. |
| 2020/0309941 A1* | 10/2020 | Makari ................... H04W 4/48 |

FOREIGN PATENT DOCUMENTS

| | | |
|---|---|---|
| DE | 102015109468 A1 | 12/2016 |
| DE | 102017110144 A1 | 10/2018 |
| WO | 2018079600 A1 | 5/2018 |

* cited by examiner

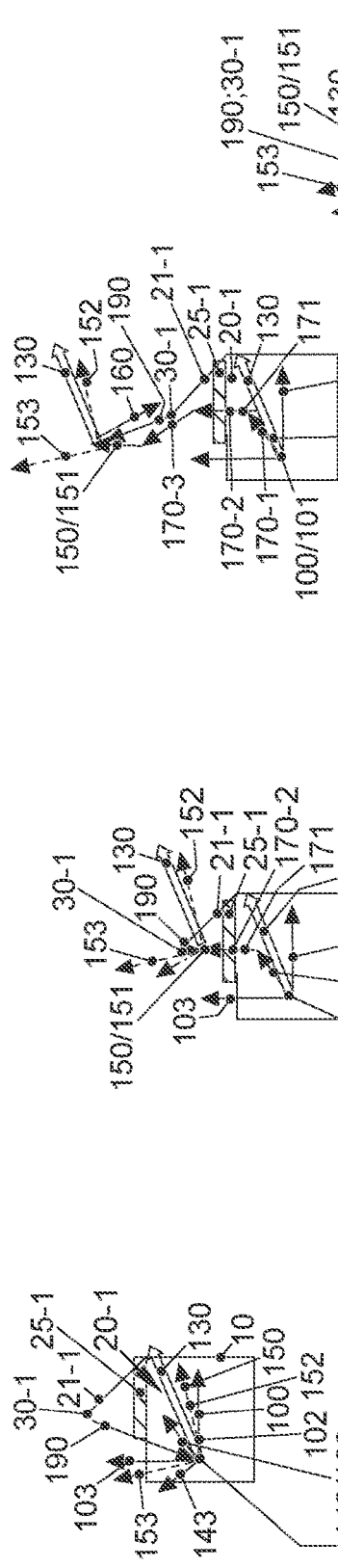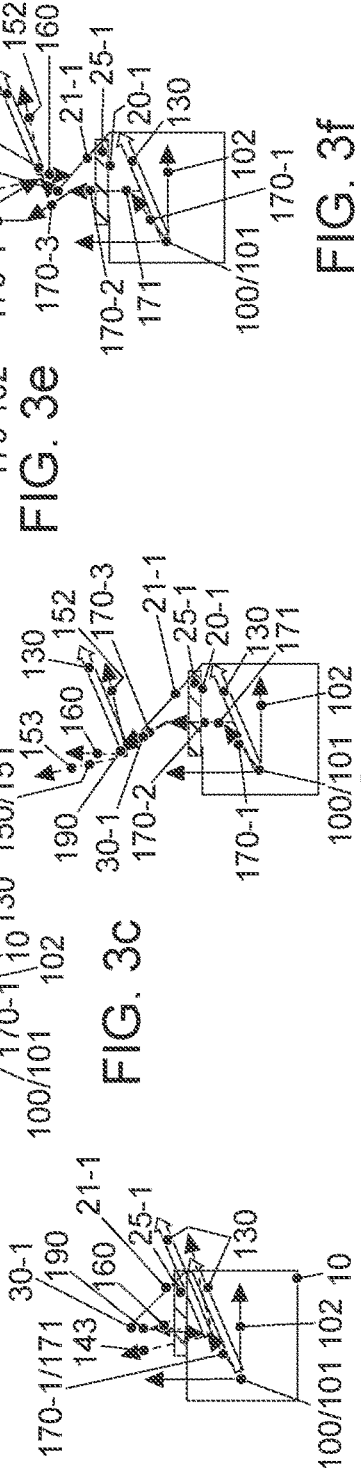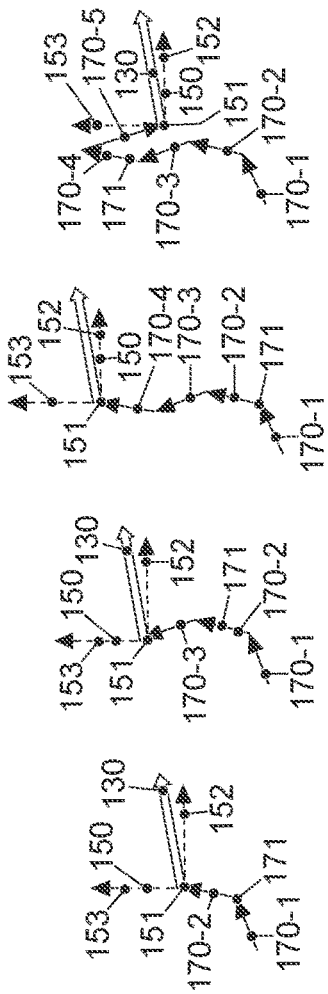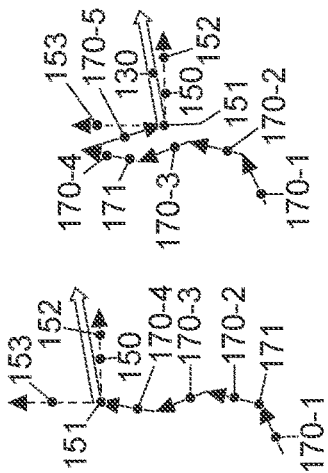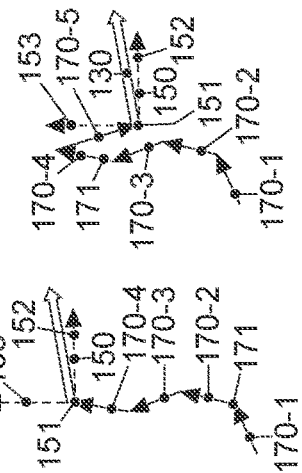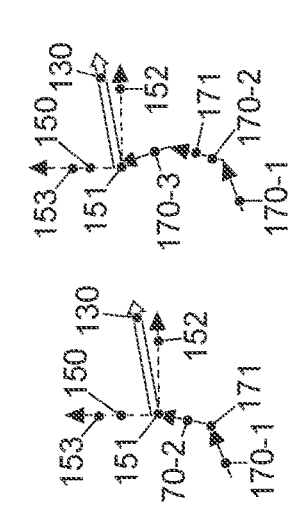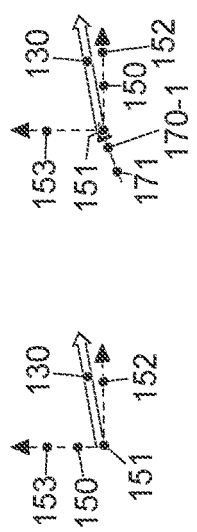

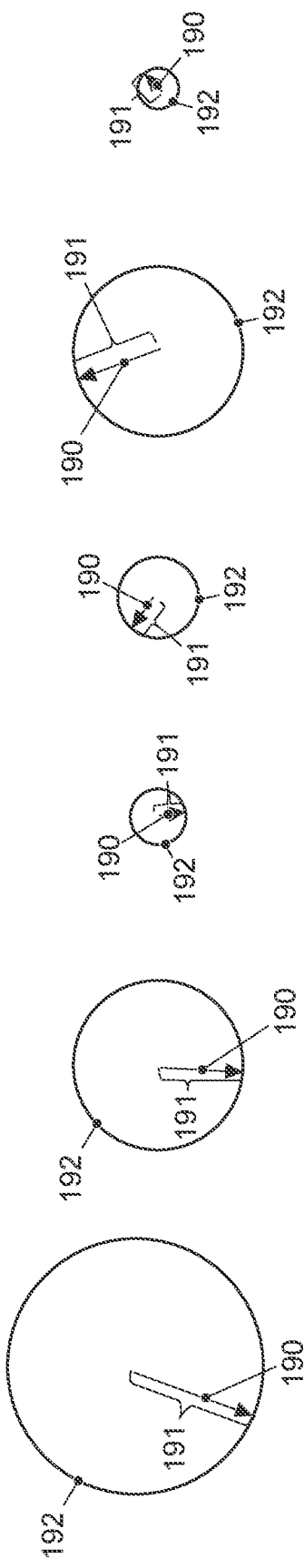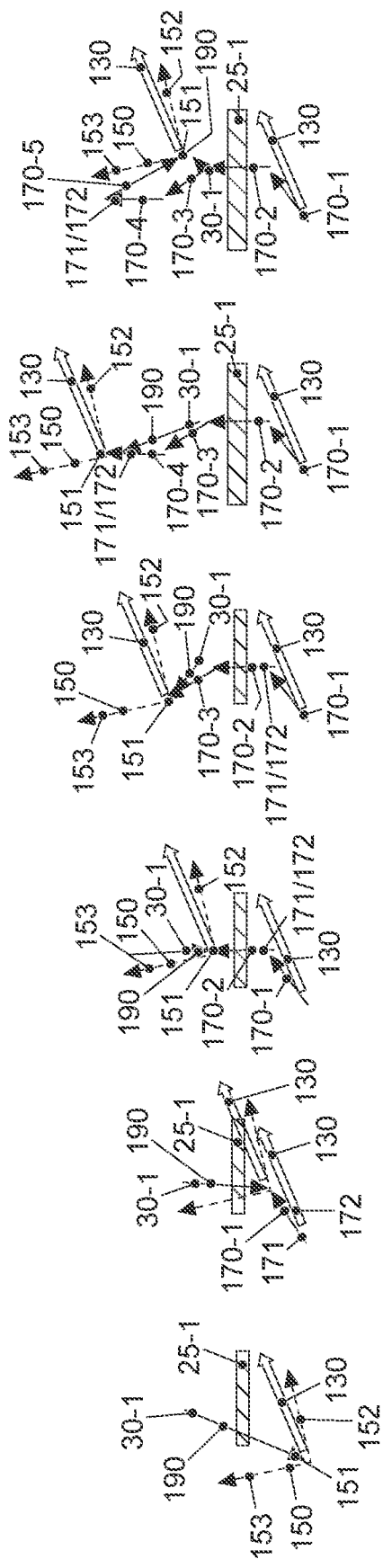

INTERIOR AND EXTERIOR RECOGNITION OF ID TRANSMITTERS FOR A VEHICLE

PRIORITY CLAIM

This patent application claims priority to German Patent Application No. 10 2019 211 192.0, filed 26 Jul. 2019, the disclosure of which is incorporated herein by reference in its entirety.

SUMMARY

Illustrative embodiments relate to a system and a method for ascertaining whether or not an ID transponder is located in the interior of a transportation vehicle. This is described as interior and exterior identification of an ID transponder. illustrative embodiments further relate to a transportation vehicle and an ID transponder with which the method can be carried out.

BRIEF DESCRIPTION OF THE DRAWINGS

The disclosed embodiments are explained in greater detail hereinafter with reference to the drawings. In the drawings:

FIGS. 3a-3f show schematic representations of the recording of the self-movement of an ID transponder during a disembarking process via a left front vehicle door;

FIGS. 4a-4f show schematic representations of the information determined at the different points in time regarding the self-movement and the path segments which are derived therefrom;

FIGS. 5a-5f show the distances determined at the different points in time of the ultra-wideband transmission and receiving device from the ID transponder; and FIGS. 6a-6f show schematic representations of the access area and adjustments of the determined path segments to the determined distances, to form path curves from the path segments and to ascertain the ID transponder entering or exiting the interior.

DETAILED DESCRIPTION

Figure 1A:
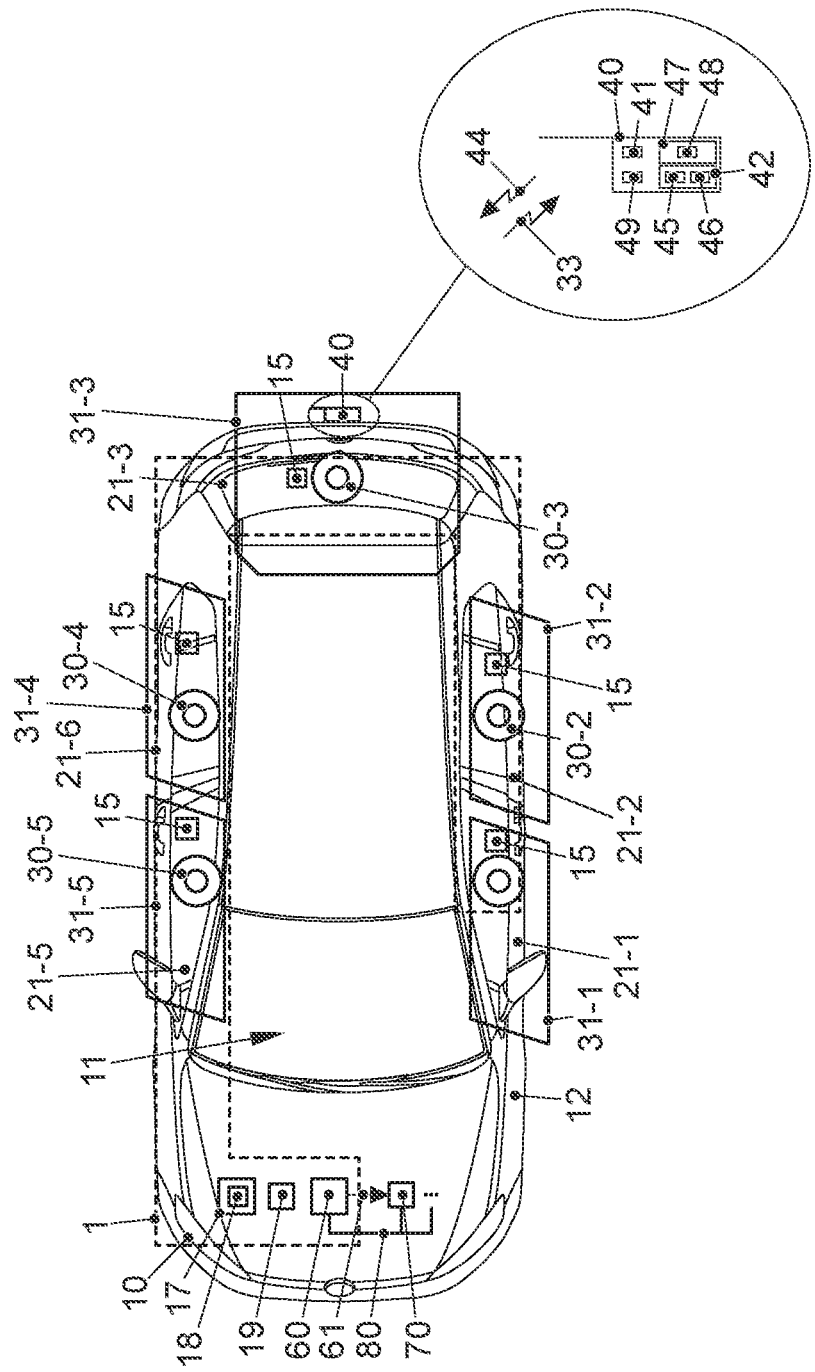
FIG. 1a shows a schematic plan view of a transportation vehicle.

ID transponders are devices which can exchange a code with a transportation vehicle via wireless communication, which code the transportation vehicle uses to enable functions, for example, opening the doors and/or starting the engine. ID transponders are therefore portable mobile devices which a user of a transportation vehicle carries on their body. In the prior art, ID transponders of this type are known in keyless entry systems which are described as Keyless Go systems, for example. If a user approaches the transportation vehicle while carrying the ID transponder, the user approaching the transportation vehicle is identified by proximity sensor technology, for example. The transportation vehicle initiates a wireless communication with the ID transponder and the ID stored therein is retrieved. If this ID corresponds with the transportation vehicle, the vehicle door locks are unlocked so that the user can get into the transportation vehicle.

For insurance reasons, it is desirable if a locked transportation vehicle cannot be unlocked if a user who is not authorized to use the transportation vehicle approaches the transportation vehicle and the ID transponder which corresponds to the transportation vehicle is forgotten by the authorized user in the interior of the transportation vehicle, for example. To prevent the ID stored in the ID transponder being retrieved via wireless communication and transportation vehicle functions being enabled as a result when an unauthorized user approaches the transportation vehicle, it is desirable that access is only enabled if the ID transponder was already located outside of the transportation vehicle interior during approach. Correspondingly, activating the vehicle engine via the ID of the ID transponder should only be possible if the ID transponder is located in the interior of the transportation vehicle. In both situations, it is thus desirable to be able to carry out an interior and exterior identification of an ID transponder for a transportation vehicle in a reliable manner.

An authentication system for a transportation vehicle for authenticating a portable ID transponder to the transportation vehicle for enabling vehicle functions is known from DE 10 2017 110 144 A1. The authentication system has a first transportation vehicle ultra-wideband interface (transportation vehicle UWB interface) and a second transportation vehicle UWB interface, a control method or mechanism, optional proximity sensors as well as optional low frequency interfaces. At least one antenna of the first transportation vehicle UWB interface is arranged on the outside of the sheet metal shell of the transportation vehicle. The described system is intended to prevent so-called relay station attacks, in the case of which the wireless communication connection between the transportation vehicle and the ID transponder is bypassed via other technical aids, which serve as relays, while the ID transponder is not located in close proximity of the transportation vehicle. For this purpose, it is exploited that the ultra-wideband communication (UWB) communication is carried out by pulsed signals. Since a wide frequency spectrum is used at the same time, the propagation of the signals is very limited. Furthermore, the distance between the ultra-wideband transmission and receiving device of the transportation vehicle and the ID transponder can be determined from the temporal progression of the communication between an ultra-wideband communication request and the subsequent ultra-wideband communication response, taking into account the transit time of electromagnetic waves.

US 2015/0291126 A1 describes a system in which actually opening a door or lid, for example, a trunk lid, is controlled by recording a movement of the user relative to the transportation vehicle in the space in front of the transportation vehicle and a pattern being derived therefrom which can be compared to previous patterns. If the movement pattern of the user coincides with the pattern saved in the transportation vehicle, the vehicle door or vehicle lid is opened. In addition, the ID of an ID transponder can be evaluated so that opening only takes place if the movement pattern coincides with the predetermined movement pattern and the ID is additionally identified as corresponding with the transportation vehicle. Ultrasonic sensors of a park distance control (PDC) can be used to establish the movement pattern of the user. Alternatively, measuring the distance to the ID transponder by an ultra-wideband communication with the ID transponder to derive the movement pattern therefrom is described.

US 2015/0258962 A1 also shows a system of this type.

DE 10 2015 109 468 A1 describes an authorization system for transportation vehicles, which system has at least one authentication element, at least one apparatus for locating the authentication element and at least one comparison unit, wherein the authentication element, in particular, a key or a Keyless Go method or mechanism for a transportation vehicle, has at least one radio interface for transmitting and/or receiving at least one transportation vehicle-generated location data signal, at least one inertial sensor element for recording inertial data in relation to at least one movement and/or at least one acceleration, at least one inertial data interface for transmitting and/or receiving inertial data, wherein the apparatus is intended to be arranged on the transportation vehicle, and wherein the apparatus has at least one radio device for transmitting and/or receiving the location data signal, and at least one location data signal exchange interface for exchanging location signal data with the comparison unit, wherein the comparison unit has at least one receiving device for receiving the location signal data and the inertial data, and at least one processing unit for generating comparable data based on the location signal data and the inertial data. Moreover, the disclosed embodiments also relate to a method for controlling the access authorization with an authorization system.

DE 103 41.286 A1 describes an access control system for a transportation vehicle on a radio basis, wherein UWB radio signals are used, by which it is possible to establish the position or direction of movement of a user.

The systems known from the prior art partially use a triangulation, i.e., evaluating signal transit times between the ID transponder and two different ultra-wideband transmission and receiving devices which are installed on the transportation vehicle at different locations, for example, ultra-wideband transmission and receiving antennae, to locate the ID transponder relative to the transportation vehicle. However, this is difficult in the interior, since ultra-wideband communication is blocked by metallic objects, for example.

The disclosed embodiments create an improved system and an improved method for interior and exterior identification for an ID transponder of a transportation vehicle, which system and method can determine in a reliable manner whether or not an ID transponder is located in the interior of a transportation vehicle. Furthermore, the disclosed embodiments create a corresponding transportation vehicle and a corresponding ID transponder.

The disclosed embodiments provide a system and a method as well as a transportation vehicle and an ID transponder.

The underlying idea of the disclosed embodiments is to monitor the ID transponder entering and exiting the interior. For this purpose, the access area in front of the access openings to the interior in each case is completely covered by a communication area of one or a plurality of ultra-wideband communication devices. This means that an ID transponder must in each case pass through the transmission and receiving area, here described as the communication area, in which the ultra-wideband transmission and receiving device transmits ultra-wideband communication requests, as long as an ID transponder is expected to cross the access area. The ID transponder is designed correspondingly and has a further ultra-wideband transmission and receiving device, so that the ID transponder transmits an ultra-wideband communication response to the transportation vehicle when crossing the communication area which covers the access area to the transportation vehicle opening. It can be ascertained therefrom that the ID transponder is located in the access area to the transportation vehicle opening. In addition, it is possible to determine the distance of the ID transponder from the ultra-wideband transmission and receiving device of the transportation vehicle with which the access opening is associated. Even if this is carried out iteratively multiple times consecutively while crossing the access area, i.e., a plurality of distance values for successive points in time of the ID transponder from the ultra-wideband transmission and receiving device are determined, it cannot be clearly derived therefrom whether an ID transponder has entered into the interior of the transportation vehicle or has passed out of the interior of the transportation vehicle to the exterior. Provision is therefore made to additionally transmit information regarding the self-movement of the ID transponder to the transportation vehicle and evaluate it together with the ultra-wideband communication. The self-movement of the ID transponder can be determined by an inertial sensor system in the ID transponder. For example, acceleration sensors can be evaluated. If the determined acceleration values are incorporated over time, a speed, and, by incorporating the speed over time, a distance covered and thus a path segment which represents the movement of the ID transponder in the space over a time period, for example, can be determined. Moreover, to be able to correctly evaluate the acceleration values, which act in different spatial directions, at different points in time, it is necessary to simultaneously also evaluate the rotation of the ID transponder in the space, so that the determined accelerations can be specified with respect to a stationary coordinate system or a coordinate system which is coupled with the ID transponder, the axial directions of which coordinate system maintain the same directions with respect to a stationary coordinate system at least for a certain period of time of at least several seconds, optionally 1 minute, optionally 10 minutes. In this case, stationary methods or mechanisms relating to a point on the surface of the earth. A coordinate system which is coupled with the ID transponder, the axial directions of which coordinate system maintain their orientation relative to a stationary coordinate system at least for a period of time, is described here as a reference coordinate system.

A set of data which specify at which point in time an object is located at which position is described as a path segment. In this case, the data refer to a coordinate system which does not have to be stationary. However, all the position information always refers to the same coordinate system. A path segment can be represented as a curve in the coordinate system with respect to which it is specified. A path segment thus specifies the movement of the object in the past, i.e., for the period of time during which movement of the body was determined.

A path segment can be understood as being composed of path segment sections. The path segment sections recorded in temporal succession, which represent a path segment for each time period, together form a path segment for the period of time which comprises the identification of all path segment sections.

If a path segment is fully specified with respect to a stationary coordinate system, a path segment is described as a path curve here, by which the position of the object can be specified at different points in time. A speed and a movement direction can thus also be derived. It is not necessary for a path curve to be able to be specified by a function.

In addition to the position data, speed information, acceleration information and rotational position information can also be contained in the path segment, by which the positions are determined.

Transmitting signals with a bandwidth of more than 500 MHz or at least 20% of the arithmetic average of a lower and upper cutoff frequency of the pulsed frequency range is described as ultra-wideband communication. This results in temporally ultrashort signal pulses being exchanged. There also exists slightly different definitions.

In at least one disclosed embodiment, it is firstly not necessary to know the precise orientation of the individual axes of the reference coordinate system in relation to the stationary coordinate system, for example, a coordinate system which is fixedly connected to the transportation vehicle. The determined path segments can thus be 3D curves which specify the relative movement of the ID transponder in the space. Since the ID transponder is constantly moving in the space, the origin of the reference coordinate system moves with the ID transponder. Since the rotation of the ID transponder is evaluated, the axes of the reference coordinate system can be kept stable in terms of orientation with respect to a stationary reference coordinate system which is firmly linked to the stationary transportation vehicle. A path segment which is output by the ID transponder thus specifies a movement in the current reference coordinate system which is linked to the ID transponder, for example, by which the movement of the origin of an ID transponder coordinate system is specified for a preceding time period. A coordinate system whose axes are coupled to the physical form of the ID transponder is described as an ID transponder coordinate system. If the ID transponder rotates in the stationary coordinate system, the ID transponder coordinate system also rotates. The reference coordinate system of the ID transponder, i.e., the axes thereof, do not rotate in the stationary coordinate system. In the case of a translation of the ID transponder in the stationary coordinate system, the origins of both coordinate systems which are coupled with the ID transponder, the ID transponder coordinate system and the reference coordinate system, move. For example, the path segment thus specifies the center of gravity movement of the ID transponder for a set time span of 5 seconds, optionally 10 seconds, more optionally 30 seconds or a longer time period, for example.

To be able to specify the orientation of the axes of the ID transponder coordinate system relative to the coordinate system fixedly connected to the transportation vehicle, provision is made in an exemplary embodiment for the transportation vehicle and the ID transponder to each have a vector field sensor system, to determine at least from one earth-bound vector field its local direction, which direction is used as a reference direction for coordinate axis directions, with respect to which the information regarding the self-movement of the ID transponder is specified. The orientation of the reference coordinate system of the ID transponder can be specified via the local direction, for example, of the earth's magnetic field in the coordinates of the reference coordinate system of the ID transponder, so that the transportation vehicle, which can also establish the direction of the earth's magnetic field, can convert the axial directions of the reference coordinate system into the individual axial directions of the stationary or transportation vehicle-linked coordinate system accordingly.

According to an exemplary embodiment, the vector quantity is a magnetic field strength of the earth's magnetic field. The earth's magnetic field can be determined in a simple and reliable manner by the sensor system of the ID transponder and also by the corresponding sensor system of the transportation vehicle. Local disturbances of the magnetic field are almost identical for both systems.

The information regarding the self-movement of the ID transponder can be exchanged with the transportation vehicle via any wireless communication device. It has proved beneficial to transfer the information regarding the self-movement of the ID transponder from the ID transponder to the transportation vehicle by the ultra-wideband communication. This communication takes place anyway, so that the corresponding information regarding the self-movement can therefore also be exchanged.

However, other disclosed embodiments can make provision for the information regarding the self-movement of the ID transponder to be exchanged with the transportation vehicle via a different form of communication, for example, a low frequency communication (LF communication) or a high frequency communication (HF communication). At least one exemplary embodiment therefore makes provision for the information regarding the self-movement of the ID transponder to be transferred by a wireless communication which is different from the ultra-wideband communication. All known wireless forms of communication, such as BLUETOOTH®, WIFI, etc. can be used.

To achieve complete covering of an access area to an access opening through a communication area of the transportation vehicle interior, it has proved beneficial if the at least one of the one or plurality of ultra-wideband transmission and receiving devices, associated with one of the access openings, is in each case arranged on a door or lid which is provided for closing the respective access opening. This can ensure that, when opening the corresponding door or lid, the access area to the access opening is completely by the communication area, i.e., the area in which an ultra-wideband communication can be carried out between an ID transponder and the corresponding ultra-wideband transmission and receiving device arranged on the door or lid, in a simple and reliable manner.

To additionally also be able to monitor the ID transponder entering or exiting the interior of the transportation vehicle, however if the vehicle door or vehicle lid is closed this includes a window which can be opened, which is opened, the at least one of the one or plurality of ultra-wideband transmission and receiving devices, arranged on a door or lid, i.e., on a component which is provided for closing the respective access opening, is arranged in an area of a window or adjacent to the window of the component or the door or the lid. An arrangement in the area of the window or on the window can be beneficial even in cases in which the window cannot be opened. Window materials do not or barely obstruct propagation of electromagnetic radiation used for ultra-wideband communication. The radiation can therefore penetrate the window. The surrounding area on both sides of the door can thus be monitored for the presence of the ID transponder at the same time with the same ultra-wideband transmission and receiving device.

In at least one exemplary embodiment, provision is made in the ultra-wideband communication for spatial distances of the ID transponder from the ultra-wideband transmission and receiving device, in the communication area of which the ID transponder is located, to be determined from time intervals between transmitting the ultra-wideband communication requests and receiving a subsequent ultra-wideband communication response, and the movement of the ID transponder through the access area together with the transferred information regarding the self-movement of the ID transponder to be determined and/or checked for plausibility therefrom. Since a distance between the ultra-wideband transmission and receiving device and the ID transponder delimits the position relative to the ultra-wideband transmission and receiving device to only a spherical shell segment, the actual path curve of the movement of the ID transponder cannot be established or can only be established in a very imprecise manner by the distances. Nevertheless, it can indeed often be ascertained from the distances whether the ID transponder is moving into the interior of the transportation vehicle and is entering it or is exiting the interior. However, if the information regarding the self-movement of the ID transponder, determined by the ID transponder itself, is additionally used, path segments derived therefrom can be checked for plausibility relative to the determined distances. For example, it is possible to check whether the positions of the ID transponder arising in a path segment at different points in time coincide with determined distances of the ID transponder at these points in time, taking into account that the distances are only known within a spherical shell.

In an exemplary embodiment, provision is made for the information regarding the self-movement to contain data of a path segment of the movement of the ID transponder or a path segment of the movement of the ID transponder is determined from the information regarding the self-movement, and the path segment is positioned as a path curve by the determined distance positions relative to the access area and the entering into the interior is ascertained if the path curve points through the access area into the interior, and the exiting of the interior is ascertained if the path curve points out of the interior through the access area. While in a path segment only the relative movement is known with respect to a reference coordinate system, the orientation of which is known with respect to the coordinate system fixedly coupled to the transportation vehicle, the original position of which, however, is still unknown, spatial distances to the ultra-wideband transmission and receiving device can be concluded by using from the time intervals between transmitting the ultra-wideband communication requests and the ultra-wideband communication responses received thereafter, taking into account the propagation speed of the electromagnetic radiation. Since a distance defines the position of the ID transponder only on a spherical shell relative to the position of the ultra-wideband transmission and receiving device, a path segment also cannot yet be clearly located in the space accordingly. However, if a plurality of distances are analyzed over time, and are correlated with the corresponding positions of the path segments which correspond to the same times, this makes it possible to determine a path curve from a determined path segment, i.e., position the path segment relative to the access area. If the path curve which is formed therefrom points into the interior of the transportation vehicle, it may be concluded therefrom that the ID transponder is entering the interior of the transportation vehicle. In contrast, if the path curve points out of the interior, it may be concluded that the ID transponder is exiting the interior. A direction of the path curve is specified by a time at which the ID transponder was located at the corresponding position being associated with each of the individual positions of the path segment.

In an exemplary embodiment, the ultra-wideband transmission and receiving device is activated when a component which closes an access opening of the transportation vehicle interior is opened. In such an event, the ultra-wideband transmission and receiving device or the plurality of ultra-wideband transmission and receiving devices which are necessary to completely cover the access area with their communication areas are activated.

It is also beneficial to activate an ultra-wideband transmission and receiving device if, in the case of a closed component which closes an access opening, for example, a transportation vehicle door, if an approach on the component which is still in the closed state is identified. For example, a transportation vehicle component of this type may contain proximity sensor technology.

Furthermore, it is beneficial to further monitor the position of the ID transponder in the interior, in particular, by the information determined by the ID transponder regarding the self-movement. If a position is determined for the ID transponder, which indicates an exiting of the interior or ascertains a movement towards a boundary of the interior, one or a plurality of the ultra-wideband transmission and receiving devices is or are thus activated in an exemplary embodiment, to check an exiting of the ID transponder for plausibility.

In principle, provision can be made to compare the data, determined based on the information supplied by the ID transponder itself regarding its self-movement, for example, a path segment or even a path curve, with the data which are derived from the ultra-wideband communication, for example, the determined distances of the ID transponder from one of the ultra-wideband transmission and receiving devices. For example, a confidence level can be determined which specifies whether the path segment or the path segment sections thereof is or are compatible with the determined distance values. If the path segment indicates that the ID transponder has left the interior and if a predetermined threshold value is exceeded by the confidence level, the interior signal is thus changed, for example, so that the exiting of the interior is signaled for other transportation vehicle control devices. Even in situations in which path segments or path segment sections present at different points in time cannot be located in the space or a coordinate system linked to the transportation vehicle and thus be converted into a path curve, reliable information about the entering and/or exiting of the interior can be identified by the ID transponder.

FIG. 1 represents a schematic plan view of a transportation vehicle 10 having a system 1 for interior and exterior identification. An interior 11 of the transportation vehicle is completely enclosed by the body 12. The transportation vehicle which is represented possesses access openings 20. These are located at the front on the left 20-1, at the rear on the left 20-2, at the rear 20-3, at the rear on the right 20-4 and at the front on the right 20-5. Adjustments, such as 20-x, wherein x is a natural number, are used to differentiate between identical technical features in an object and to identify them via a number index. The access openings 20 are all closed in the represented state of the transportation vehicle. There is a transportation vehicle component 21 in front of each of the access openings 20, which transportation vehicle component can be in a closed and an open state. The left front door 21-1 is arranged in front of the access opening at the front on the left and it closes these access openings at the front on the left 20-1. Correspondingly, the other access openings 20-x are closed by a left rear door 21-2, by a tailgate 21-3, by a right rear door 21-4 and by a right front door 21-5.

An ultra-wideband transmission and receiving device 30 is arranged on each of the components 21 which closes one of the access openings 20. The indexes of the ultra-wideband transmission and receiving devices 30-1 to 30-5 correspond to the respective access openings or to the transportation vehicle components 21-1 to 21-5 which close these access openings 20-1 to 20-5.

Furthermore, communication areas 31-x are marked in FIG. 1 on the outside of the transportation vehicle 10 for the individual ultra-wideband transmission and receiving devices 30-x. The ultra-wideband transmission and receiving devices 30-x are each designed in such a way that they transmit ultra-wideband communication requests in their corresponding communication area 31-x in an active state. If an ID transponder 40 is located in the communication area 31-3 of the ultra-wideband transmission and receiving device 30-3 of the tailgate 21-3, for example, a further ultra-wideband transmission and receiving device 41 of the ID transponder 40 responds to the ultra-wideband communication request 33 with an ultra-wideband communication response 44. By exchanging a large number of wideband communication messages, which also include the wideband communication request 33 and the wideband communication response 44, information can also be transferred from the ID transponder 40 to the transportation vehicle 10.

For example, the transportation vehicle 10 identifies that a user (not represented) is approaching the transportation vehicle 10 with the ID transponder 40 in the area of the tailgate 21-3 via a proximity sensor 15. The ultra-wideband communication then commences by way of the ultra-wideband transmission and receiving device 30-3 and the corresponding data are exchanged. In this case, an identification number is requested which identifies to the transportation vehicle 10 that the ID transponder 40 is authorized to unlock the tailgate 21-3, for example.

Figure 1B:
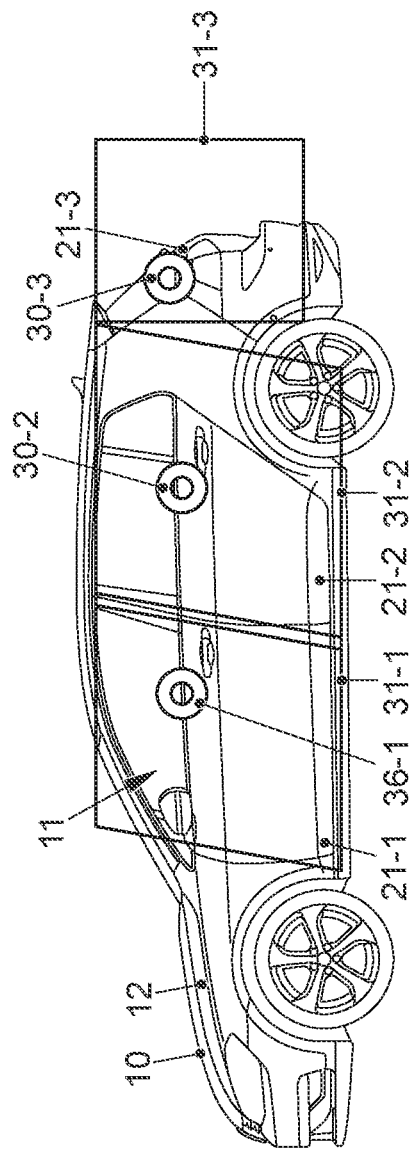
FIG. 1b shows a schematic side view of a transportation vehicle.
Figure 1C:
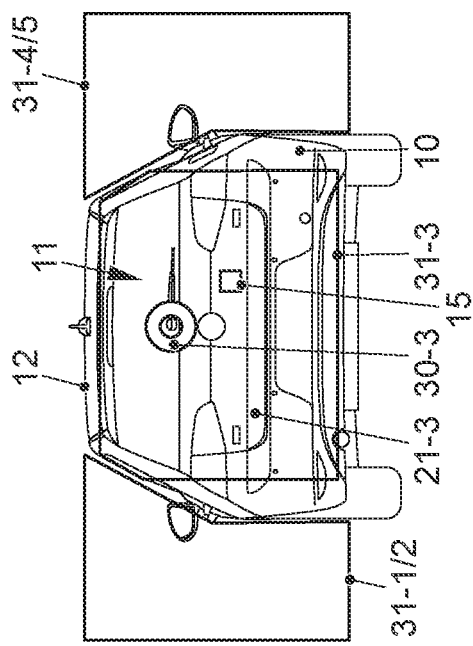
FIG. 1c shows a rear view of a transportation vehicle.

FIG. 1b and FIG. 1c represent the transportation vehicle schematically from the left side and from the rear respectively. Identical technical features are described using the same reference numbers in all of the figures.

Figure 1D:
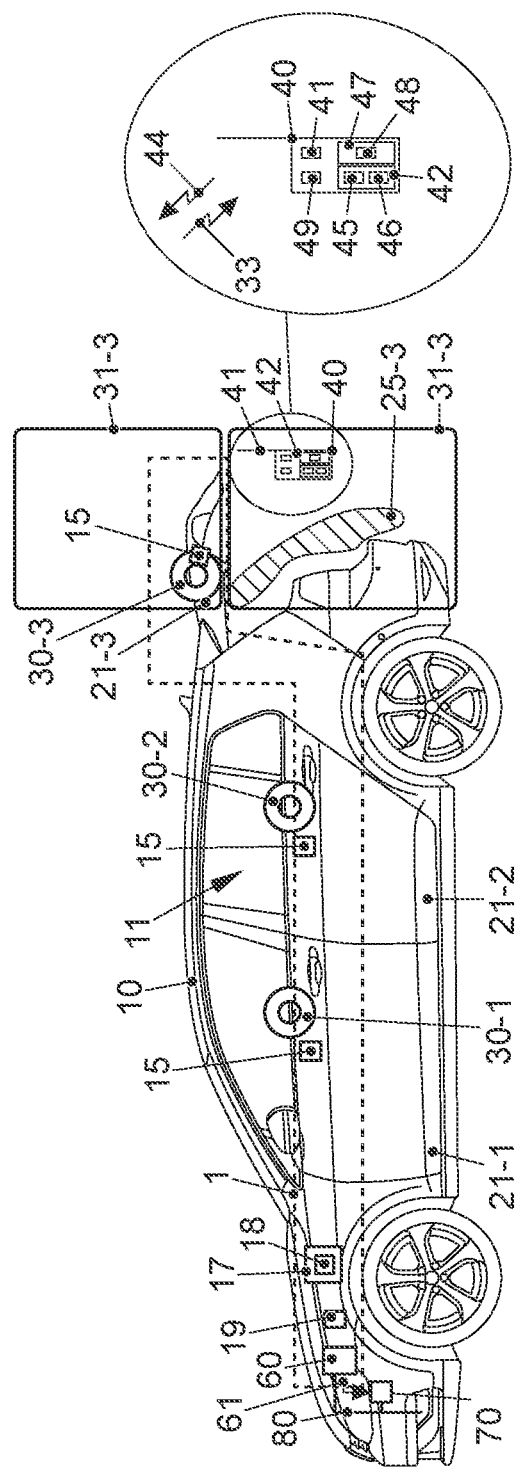
FIG. 1d shows a schematic side view of a transportation vehicle with an open tailgate.

FIG. 1d represents the transportation vehicle 10 with an open tailgate 21-3. The access opening 20-3 is therefore open. An access area 25-3 which an object has to cross to reach the interior 11 of the transportation vehicle 10 is completely covered by the communication area 31-3 of the ultra-wideband transmission and receiving device 30-3 of the tailgate 21-3. The transportation vehicle 10 can determine a distance of the ID transponder from the ultra-wideband transmission and receiving device 30-3 from the time interval between transmitting an ultra-wideband communication request and the subsequent ultra-wideband communication response from the ID transponder 40. In this case, the propagation speed of electromagnetic radiation and the time span between transmitting and the ultra-wideband communication request and receiving the ultra-wideband communication response are used. Since the ultra-wideband communication requests are transmitted iteratively, a large number of distances are thus determined over time.

In addition, the ID transponder 40 is equipped with an inertial sensor system 42 which can record self-movements of the ID transponder via acceleration sensors 45. In addition, the inertial sensor system 42 comprises rotational position sensors 46 which can record changes in the rotational position of the ID transponder 40 in all spatial directions. This makes it possible to determine a speed of the ID transponder 40 and path segments of the ID transponder 40 therefrom by the recorded accelerations. In addition, the ID transponder 40 has a vector field sensor system 47 which can establish a direction of a field strength, for example, the direction of the magnetic field. This makes it possible for the information regarding the self-movement of the ID transponder 40 to be related to an external vector direction which is constant, at least on a time scale which significantly exceeds embarking and disembarking processes. The vector field sensor system 47 comprises a magnetic field sensor 48, for example. The transportation vehicle 10 also has a vector field sensor system 17, for example, with a magnetic field sensor of a magnetic field sensor system 18, with which the transportation vehicle can establish the direction of a vector field, for example, the earth's magnetic field.

The ID transponder 40 is designed to transfer the information recorded by the inertial sensor system 42 regarding the self-movement of the ID transponder 40 to the transportation vehicle 10. This takes place via the ultra-wideband communication, for example, but can also take place via a different wireless communication interface 19/49. This can take place via a low frequency interface (LF interface) or a high frequency interface (HF interface), for example, as typically already used in the prior art for the communication between transportation vehicles 10 and the ID transponders 40. Exchanging an identification number to identify the ID transponder 40 to the transportation vehicle 10 can also take place via a different communication interface 19/49 of this type.

The information transferred from the ID transponder 40 regarding the self-movement is evaluated by the transportation vehicle 10 together with spatial distance information which is determined from the ultra-wideband communication, to ascertain whether the ID transponder 40 is moving through the access area 25-3 of the rear access opening 20-3 into the interior 11 of the transportation vehicle 10. If this is ascertained, an interior signal 61 is provided by the control device 60, which signal specifies that the ID transponder 40 is located in the interior 11 of the transportation vehicle 10. This interior signal 61 can be evaluated by other control apparatuses 70 which are provided with the interior signal 61 via a transportation vehicle bus 80, for example, to allow the main engine to start or to prevent it from starting if the interior signal 61 indicates that the ID transponder 40 is not present in the interior 11 of the transportation vehicle 10 or no interior signal 61 is available.

Figure 2A:
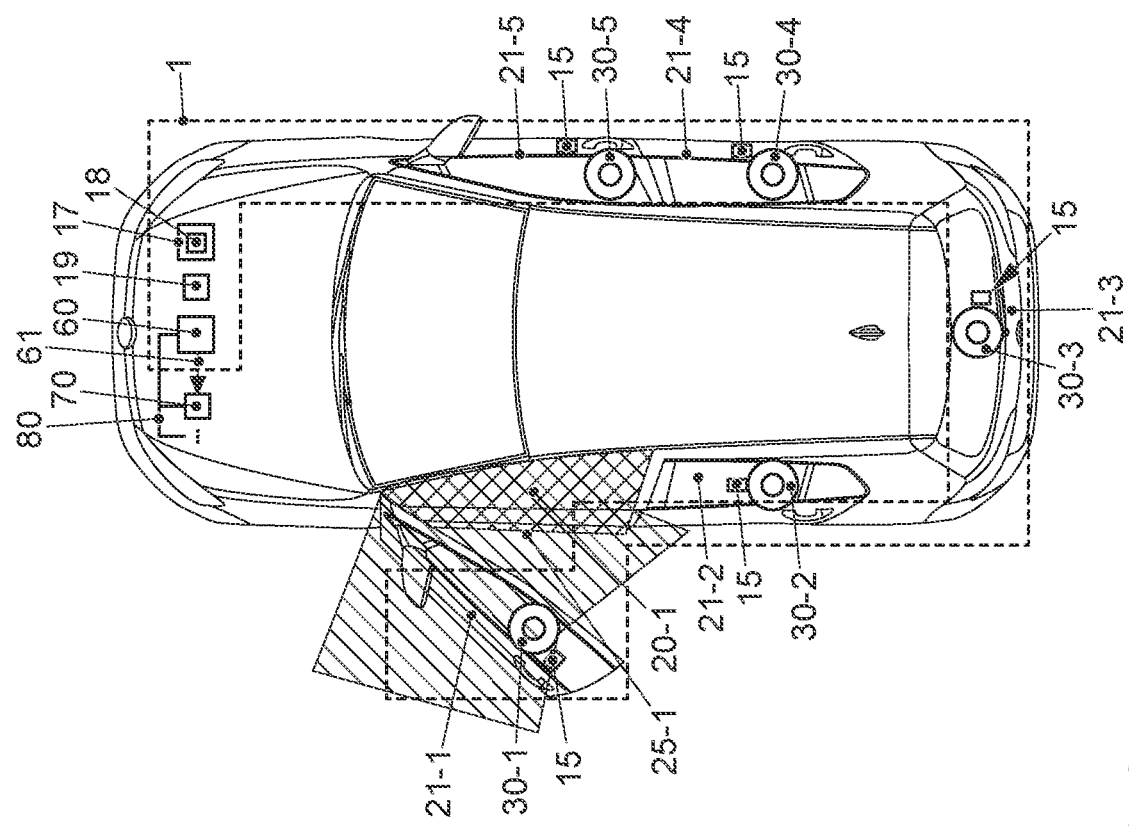
FIG. 2a shows a schematic plan view of a transportation vehicle with an open left front door.
Figure 2B:
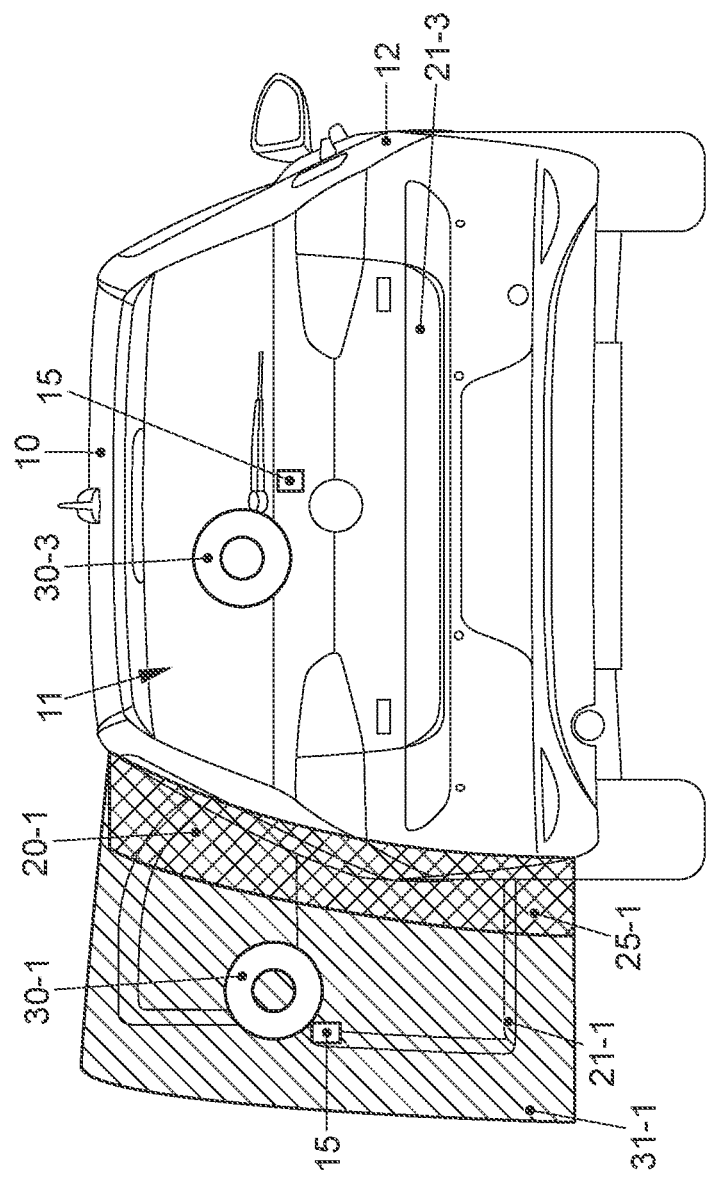
FIG. 2b shows a rear view of a transportation vehicle with an open left front door.

FIG. 2a and FIG. 2b respectively show a plan view and a rear view of a situation of the transportation vehicle 10 which arises from an open left front transportation vehicle door 21-1. Corresponding identical technical features are provided with identical reference numbers in all of the figures. The communication area 31-1 of the ultra-wideband transmission and receiving device 30-1 as well as the access area 25-1, which is completely covered by the communication area 30-1, are clearly visible. The access area 25-1 extends over the entire access opening 20-1 of the front left transportation vehicle opening 20-1 which is closed by the left front transportation vehicle door 21-1 in the closed state.

Determining the self-movement of the ID transponder when disembarking a transportation vehicle through a left front transportation vehicle door is intended to be explained in an exemplary and simplified manner using FIGS. 3a-3f as well as FIGS. 4a-4f, FIGS. 5a-5f and FIGS. 6a-6f. FIGS. 3a-3f in each case represent a transportation vehicle 10 schematically, the left front transportation vehicle door 21-1 of which is open, so that the access opening 20-1 is open at the front on the left of the transportation vehicle 10. A transportation vehicle coordinate system 100, the origin of which can be located on a central axis of the transportation vehicle, is coupled with the transportation vehicle 10. An x-axis 102 points in the direction of travel and a y-axis 103 which is oriented perpendicular thereto to the left side of the transportation vehicle. For reasons of simplicity, the third spatial direction, the z-axis which points out of the image plane, is not marked and is not further taken into account in the following explanation, although it is clear to the person skilled in the art that that which is described takes place in three-dimensional space and the third dimension, in this case a z-direction, is to be additionally taken into account in real life.

An ID transponder 40 possesses an ID transponder coordinate system 140 which is fixedly coupled with the physical form of the ID transponder, the x-axis 142 and the y-axis 143 of which ID transponder coordinate system are represented schematically in FIG. 3a. For reasons of simplicity, the ID transponder 40 itself is not physically represented. FIG. 3a further represents the direction vector 130 of the earth's magnetic field as a double arrow. This always retains the same orientation relative to the transportation vehicle coordinate system 100, since the transportation vehicle 10 is stationary. This orientation in the transportation vehicle coordinate system is measured by the transportation vehicle by a corresponding magnetic sensor system 18 (see FIG. 1). The magnetic sensor system 48 of the ID transponder 40 (see FIG. 1) also establishes the direction of the direction vector 130 of the earth's magnetic field.

To be able to determine and specify a self-movement of the ID transponder, determined by the inertial sensor system 42, in the space, a further coordinate system, which is movable with respect to the origin but is "stationary" or "orientation-fixed" with respect to the axis orientations, is linked to the ID transponder 40. This is described as an ID transponder reference coordinate system 150 or also as a reference coordinate system for short. The x-axis and y-axis 152 and 153 thereof have a fixed orientation in relation to the determined direction vector 130 of the earth's magnetic field, which is also removed as a double arrow in each case from the origin 152 of the ID transponder reference coordinate system 150.

FIGS. 3a-3f in each case specify the movement direction of the ID transponder via a dotted movement arrow 160 and the distance traveled by the ID transponder 40 until the next point in time of the disembarking action via a length of this movement arrow 160, which is represented in the subsequent figure. FIGS. 3a-3f show the disembarking situation at successive, temporally equally spaced-apart moments. It is assumed that the current movement arrow 160 simultaneously specifies the orientation of the ID transponder and thus the direction of the x-axis of the ID transponder coordinate system 140 which is firmly linked to the physical form of the ID transponder 40. For reasons of clarity, the ID transponder coordinate system is not represented in any of further FIGS. 3b to 6f. However, the position thereof can be easily determined by each of the inserted movement arrows 160.

The ID transponder 40 itself does not know the position of the origin 141 of the ID transponder coordinate system 140 nor the position of the origin 151 of the ID transponder reference coordinate system 150 in the space, i.e., in relation to the transportation vehicle coordinate system 100. The origin 151 of the ID transponder reference coordinate system 150 thus moves with the ID transponder 40, so that the origin 151 of the ID transponder reference coordinate system 150 always coincides with a fixed position in the ID transponder, for example, the center of gravity thereof. In the figures, the position of the ID transponder 40 can thus be extracted by the origin 151 of the ID transponder reference coordinate system 150. The orientation can be identified at any time by the movement arrow 160 marked. It is clear to the person skilled in the art that this is a simplification which is only selected here for the purposes of representation and explanation. In reality, the ID transponder can move in any direction in relation to the axes thereof, i.e., rotate relative to the movement direction. However, the inertial sensor system 42 (see FIG. 1) of the ID transponder 40 determines a movement in the ID transponder reference coordinate system 150 by this rotation and by the accelerations. The movement covered is removed as a path segment section 170-n, wherein n is a natural number and the path segment sections 170 are numbered in chronological order. The path segment section 170 which is covered last in each case points to the origin 151 of the ID transponder reference coordinate system 150. The process represented in FIGS. 3a-3f is thus as follows: firstly, a user with the ID transponder moves sideways toward the front to the left, then to the left out of the transportation vehicle and crosses the access area 25-1. They move backward slightly to the left, then to the left, turn and move again toward the open transportation vehicle door and, in the next operation, the result of which is no longer represented, would close the transportation vehicle door by way of a movement to the right.

FIGS. 4a-4f now in each case schematically represent the information which the ID transponder can transfer to the transportation vehicle. On the one hand, it is specified how the direction vector 130 of the earth's magnetic field is oriented in the ID transponder reference coordinate system 150. The transportation vehicle can determine the orientation of the ID transponder reference coordinate system 150 relative to its own transportation vehicle coordinate system 100 by this information, since it knows the vector direction 130 of the earth's magnetic field in the transportation vehicle coordinate system 100 from its own measurements. In addition, the ID transponder 40 provides path segment information, which can only be acceleration values along the individual axial direction of the ID transponder reference coordinate system or acceleration information with respect to the ID transponder coordinate system which is not represented as well as the rotation angle with respect to the vector direction of the earth's magnetic field. In the disclosed embodiment represented here, it is assumed that the ID transponder 40 itself determines path segment sections 170-n and/or path segments 171 by this acceleration and rotation angle information and provides them with respect to the ID transponder reference coordinate system 150. In other disclosed embodiments, the transportation vehicle itself can determine this in its control device 60 (see FIG. 1). It is clear that in each case a path segment 171 arises from the path segment sections 170-n. However, the position thereof in the space cannot then be precisely determined for the transportation vehicle if the direction vector 130 were to be oriented parallel to the direction vector 130 in the transportation vehicle coordinate system 100. In FIGS. 4a to 4f, the ID transponder reference coordinate system 150 is in each case designed in such a way that the x-axis 152 is oriented horizontally on the drawing sheet.

In FIGS. 5a-5f, the distance vectors 190 of the ID transponder 40 from the ultra-wideband transmission and receiving device 30-1 of the left front door, which is arranged on the external open end of the left front transportation vehicle door 21-1, are recorded. However, the direction in the space is not known to the transportation vehicle 10, but instead only the distance which corresponds to a circle or circular arc sections 192 in the two-dimensional plane represented. In the three-dimensional case, this would be a spherical shell or a spherical shell segment, which is defined by the determined distance 191 between the ultra-wideband transmission and receiving device 30-1 and the ID transponder 40.

However, if both sets of information are combined, i.e., the determined distances at the different points in time and the path segment information, which, in addition to the information about the locations passed through, also contains information regarding the points in time at which the corresponding locations were passed through relative to one another, it is possible to locate the individual path segments 171 in the space, i.e., in relation to the coordinate system of the transportation vehicle. This is shown in FIGS. 6a-6f. The correctly determined results of the corresponding evaluation are represented. If only a small number of data points are known, there may be some ambiguity. However, if there are a large number of measurement points, the quality of the adjustment is significantly improved. As a result, a path curve 172 is then obtained in each case which provides information regarding at which point in time the ID transponder stopped at which location in the space in relation to the transportation vehicle coordinate system 100. This makes it possible to identify that the path curve 172 runs from the interior 11 of the transportation vehicle 10 through the access area 25-1 in front of the left front access opening 20-1 and therefore points from the inside to the outside, so that it can be clearly ascertained that the ID transponder 40 has left the interior 11 of the transportation vehicle 10. The ID transponder entering the transportation vehicle can also be determined in a similar manner.

At this point it should be noted that determining a path segment based on inertia information, i.e., the relative positions which an object has passed through in relation to a reference coordinate system linked to the body, can only be used for limited time periods without new calibration. However, for periods of time in which a disembarking process is taking place, the data attained with acceleration sensors and gyro sensors from conventional (rotational position sensors), so-called smartphones, for example, are sufficient.

The ID transponder can be a smartphone. However, embodiments are also possible in which an ID transponder is designed as a classic key but having an inertial sensor system and a magnetic sensor system as well as communication interfaces and is equipped with no or only limited human-machine interfaces designed as buttons and optionally as a light signal as feedback.

It is clear to the person skilled in the art that only simple, exemplary embodiments are described here. The features of the different embodiments specified can be combined with one another as desired.

LIST OF REFERENCE NUMBERS 1 system for interior and exterior identification of an ID transponder
10 transportation vehicle
11 interior
12 body
15 Proximity sensor
17 vector field sensor system
18 magnetic sensor system
19 wireless communication interface
20, 20x access openings
21, 21x transportation vehicle component
21-1 door front left
21-2 door rear left
21-3 tailgate
21-4 door rear right
21-5 door front right
25, 25x access area
30, 30x ultra-wideband transmission and receiving device
31, 31x communication area
33 ultra-wideband communication request
40 ID transponder
41 ultra-wideband transmission and receiving device
42 inertial sensor system
44 ultra-wideband communication response
45 acceleration sensor
46 rotational position sensor
47 vector field sensor system
48 magnetic field sensor system
49 wireless communication interface
60 control device
61 interior signal
70 other control apparatuses
80 transportation vehicle bus
100 transportation vehicle coordinate system
101 origin
102 x-axis
103 y-axis
130 direction vector of the earth's magnetic field
140 ID transponder coordinate system
141 origin
142 x-axis
143 y-axis
150 ID transponder reference coordinate system
151 origin
152 x-axis
153 y-axis
160 movement arrow
170 path segment section
171 path segment
172 path curve
190 distance vector
191 distance
192 circle/circular arc section

The invention claimed is:

1. A system for a transportation vehicle, the system comprising:
a plurality of access openings to an interior of the transportation vehicle, wherein each of the plurality of access openings has an open state and a closed state;
a plurality of ultra-wideband transceiver devices arranged on the transportation vehicle, wherein each of the plurality of ultra-wideband transceiver devices is associated with a different one of the plurality of access openings, wherein a communication area of each of the plurality of ultra-wideband transceiver devices completely covers an access area of the associated access opening, and wherein each of the plurality of ultra-wideband transceiver devices is configured to, in response to the associated access opening being in the open state, initiates transmitting ultra-wideband communication requests; and
an ID transponder having an additional ultra-wideband transceiver device and an inertial sensor system configured to detect and record self-movements of the ID transponder,
wherein the ID transponder, in response to receiving the ultra-wideband communication requests, transmits ultra-wideband communication responses, to the plurality of ultra-wideband transceiver devices via the additional ultra-wideband transceiver device, wherein the responses indicate the detected and recorded self-movements of the ID transponder, and
wherein the transportation vehicle determines, based on the received responses indicating the detected and recorded self-movements of the ID transponder, whether a direction of movement of the ID transponder is into the interior of the transportation vehicle or out of the interior of the transportation vehicle, and transmits an interior signal indicating, based on the determination, whether the ID transponder is identified as having entered the transportation vehicle and is located in the interior of the transportation vehicle or as having exited the transportation vehicle and is located in an exterior of the transportation vehicle.

2. The system of claim 1, wherein the information regarding the self-movement of the ID transponder is transferred from the ID transponder to the transportation vehicle by the ultra-wideband communication.

3. The system of claim 1, wherein the information regarding the self-movement of the ID transponder is transferred by a wireless communication which is different from the ultra-wideband communication.

4. The system of claim 1, wherein the transportation vehicle and the ID transponder each have a vector field sensor system to determine at least from one earth-bound vector field its local direction, which direction is used as a reference direction for coordinate axes directions, with respect to which the information regarding the self-movement of the ID transponder is specified.

5. The system of claim 4, wherein the earth-bound vector field is the earth's magnetic field and a magnetic field strength of the earth's magnetic field is determined as a vector quantity.

6. The system of claim 5, wherein the at least one of the one or plurality of ultra-wideband transceiver devices, which is arranged on the closing component, is arranged in an area of a window or adjacent to the window of the closing component, in response to the window being opened.

7. The system of claim 1, wherein distances from the at least one of the one or plurality of ultra-wideband transceiver devices, which are associated with the corresponding access opening, to the ID transponder are determined by the ultra-wideband communication over time, and a path segment is determined by the determined information regarding the self-movement of the ID transponder and a compatibility of the path segment with the determined distances is checked to determine a confidence value for the identification of the ID transponder entering the interior and exiting the interior, and a change takes place in the interior signal based on at least one threshold value of the confidence value.

8. The system of claim 1, wherein the at least one of the one or plurality of ultra-wideband transceiver devices, which is associated with one of the access openings, is in each case arranged on a closing component.

9. A transportation vehicle comprising:
a plurality of access openings to an interior of the transportation vehicle, wherein each of the plurality of access openings has an open state and a closed state; and
a plurality of ultra-wideband transceiver devices arranged on the transportation vehicle,
wherein each of the plurality of ultra-wideband transceiver devices is associated with a different one of the plurality of access openings,
wherein a communication area of each of the plurality of ultra-wideband transceiver devices completely covers an access area of the associated access opening, and
wherein each of the plurality of ultra-wideband transceiver devices is configured to, in response to the associated access opening being in the open state, initiates transmitting the ultra-wideband communication requests to an ID transponder disposed in the communication area and records ultra-wideband communication responses received from the ID transponder, and
wherein the ultra-wideband communication responses received by the transportation vehicle receives from the ID transponder include data indicating self-movements of the ID transponder,
wherein the transportation vehicle determines, based on the received responses indicating the detected and recorded self-movements of the ID transponder, whether a direction of movement of the ID transponder is into the interior of the transportation vehicle or out of the interior of the transportation vehicle, and transmits an interior signal indicating whether the ID transponder is identified as having entered the transportation vehicle and is located in the interior of the transportation vehicle or as having exited the transportation vehicle and is located in an exterior of the transportation.

10. An ID transponder for a system for interior and exterior identification of the ID transponder for a transportation vehicle, wherein the ID transponder comprises an ultra-wideband transceiver device and an inertial sensor system arranged in the ID transponder, by which inertial sensor system self-movements of the ID transponder are recorded, wherein the ID transponder responds to ultra-wideband communication requests which are transmitted by one of the one or plurality of ultra-wideband transceiver devices arranged on the transportation vehicle, with ultra-wideband communication responses transportation via the further ultra-wideband transceiver device, and transfers the information regarding the self-movement of the ID transponder to the transportation vehicle.

11. The ID transponder of claim 10, wherein the information regarding the self-movement of the ID transponder is transferred from the ID transponder to the transportation vehicle by the ultra-wideband communication.

12. The ID transponder of claim 10, wherein the information regarding the self-movement of the ID transponder is transferred by a wireless communication which is different from a ultra-wideband communication.

13. The ID transponder of claim 10, wherein the transportation vehicle and the ID transponder each have a vector field sensor system to determine at least from one earth-bound vector field its local direction, which direction is used as a reference direction for coordinate axes directions, with respect to which the information regarding the self-movement of the ID transponder is specified.

14. The ID transponder of claim 13, wherein the earth-bound vector field is the earth's magnetic field and a magnetic field strength of the earth's magnetic field is determined as a vector quantity.

15. The ID transponder of claim 10, wherein distances from the at least one of the one or plurality of ultra-wideband transceiver devices, which are associated with a corresponding access opening, to the ID transponder are determined by the ultra-wideband communication over time, and a path segment is determined by the determined information regarding the self-movement of the ID transponder and a compatibility of the path segment with the determined distances is checked to determine a confidence value for the identification of the ID transponder entering an interior and exiting the interior, and a change takes place in the interior signal based on at least one threshold value of the confidence value.

16. A method for interior and exterior identification of an ID transponder for a transportation vehicle having a plurality of access openings to an interior of the transportation vehicle, the method comprising:
in response to at least one of the plurality of access openings being an open state, initiating transmitting ultra-wideband communication requests wherein a communication area of each of the plurality of access openings is a spatial area extending over an entire area of each of the plurality of access openings, and wherein the ultra-wideband communication requests are transmitted to an ID transponder disposed in the communication area;

recording ultra-wideband communication responses received from the ID transponder, wherein the ultra-wideband communication responses include data indicating self-movements of the ID transponder;

determining, based on the received responses indicating the detected and recorded self-movements of the ID transponder, whether the ID transponder entered into the interior of the transportation vehicle or exited the interior of the transportation vehicle, and generating, based on the determination, an interior signal indicating whether the ID transponder is identified as having entered the transportation vehicle and is located in the interior of the transportation vehicle or as having exited the interior and is located in an exterior of the transportation vehicle.

17. The method of claim 16, wherein, in the ultra-wideband communication, spatial distances of the ID transponder from the ultra-wideband transceiver device, in the communication area of which the ID transponder is located, are determined from time intervals between transmitting one of the ultra-wideband communication requests and receiving a subsequent ultra-wideband communication response, and the movement of the ID transponder through the access area together with the transferred information regarding the self-movement of the ID transponder are checked for plausibility therefrom.

18. The method of claim 16, wherein the information regarding the self-movement contain data of a path segment of the movement of the ID transponder or a path segment of the movement of the ID transponder is determined from the information regarding the self-movement, and the path segment is positioned in as a path curve by the determined distances relative to the access area and the entering into the interior is ascertained in response to the path curve pointing through the access area into the interior, and the exiting of the interior is ascertained in response to the path curve pointing out of the interior through the access area.

* * * * *